UNITED STATES PATENT OFFICE.

MORRIS LEVETT AND HENRY DAVIS, OF NEW YORK, N. Y.; SAID DAVIS ASSIGNOR TO SAID LEVETT.

IMPROVEMENT IN COLORING THE PLATES FOR ARTIFICIAL TEETH.

Specification forming part of Letters Patent No. 5,294, dated September 18, 1847.

*To all whom it may concern:*

Be it known that we, MORRIS LEVETT and HENRY DAVIS, of New York, in the county of New York and State of New York, have invented a new and Improved Method of Concealing the Fastenings of Artificial Teeth and the Plates to which they are attached; and we do hereby declare the following to be a full, clear, and exact description of the same, reference being had to the annexed drawing, making a part of this specification.

The nature of our invention consists, first, in providing a coating of japan or other substance to represent the color of the gum or skin of the mouth, and with this we cover the exposed surfaces and parts of the setting of gold or other material for fastening the artificial teeth and holding them in place, by which the exposed parts are made to correspond in color to the skin of the mouth and gums, and thereby prevent the exposure of the settings and fastenings when the mouth is open; secondly, in the preparing a varnish or other material and applying the same to the settings of artificial teeth, so as to cause them to represent the color of the mouth or gums.

We prepare a compound, which may be called a "varnish," "japan," or other name, as follows: two parts each of equal quantity of gum-shellac and linseed-oil, and by heat dissolve the gum in the oil, a small quantity of the spirits of turpentine being put in to aid the solution of the gum. When these are reduced to a soft state they may be ground up together with oxide of bismuth, Chinese cinnabar, and cobalt in sufficient quantities to give the required color, which may be varied by the proportion of each of these last-named articles used. The whole, being well worked together with a stone and mullet or pallet-knife, may be softened with spirits of turpentine at discretion. The material is ready for the plates in the above state, and is then to be applied to the plates with a soft brush or otherwise, so as to completely coat the desired parts with the varnish. The articles are then submitted to heat until they are baked perfectly dry, and the coating then adheres to the metal as a part of itself. Coat after coat may be thus put on, one on top of the other, until the desired color and thickness of coating shall be obtained to correspond with the color of the gums and the mouth. The settings being thus coated to represent the other parts of the mouth, the teeth appear as if natural, as it would be almost impossible to discern the settings when thus coated and inserted in the mouth.

What we claim as our invention, and desire to secure by Letters Patent, is—

1. The japanning or otherwise covering the setting or foundations of artificial teeth in such manner as to disguise the setting, so as to represent the gum or natural skin of the mouth as nearly as possible, whether the same be effected in manner described or by equivalents substantially the same.

2. The herein-described japan or varnish and the method of compounding and applying the same to the settings of artificial teeth.

MORRIS LEVETT.
HENRY DAVIS.

Witnesses:
A. I. ANDREWS.
H. M. WILLIS.